United States Patent
Hsu et al.

(10) Patent No.: US 12,346,646 B2
(45) Date of Patent: Jul. 1, 2025

(54) METHOD OF WARPAGE-AWARE FLOORPLANNING FOR HETEROGENEOUS INTEGRATION STRUCTURE

(71) Applicant: AnaGlobe Technology, Inc., Hsinchu (TW)

(72) Inventors: Yang Hsu, Tainan (TW); Min-Hsuan Chung, Yunlin County (TW); Yao-Wen Chang, Taipei (TW); Yu-Tsang Hsieh, Hsinchu County (TW)

(73) Assignee: ANAGLOBE TECHNOLOGY, INC., Hsinchu (TW)

( * ) Notice: Subject to any disclaimer, the term of this patent is extended or adjusted under 35 U.S.C. 154(b) by 793 days.

(21) Appl. No.: 17/683,826

(22) Filed: Mar. 1, 2022

(65) Prior Publication Data

US 2023/0281371 A1  Sep. 7, 2023

(51) Int. Cl.
*G06F 30/30* (2020.01)
*G06F 30/392* (2020.01)
*G06F 30/398* (2020.01)
*G06F 113/18* (2020.01)

(52) U.S. Cl.
CPC .......... *G06F 30/392* (2020.01); *G06F 30/398* (2020.01); *G06F 2113/18* (2020.01)

(58) Field of Classification Search
CPC .. G06F 30/392; G06F 30/398; G06F 2113/18; G06F 30/394
See application file for complete search history.

(56) References Cited

U.S. PATENT DOCUMENTS

| | | | |
|---|---|---|---|
| 8,589,828 B2* | 11/2013 | Lee | G03F 1/00 700/121 |
| 9,685,414 B2* | 6/2017 | Shuto | H01L 24/19 |
| 2022/0240383 A1* | 7/2022 | Abbaspour | H01L 21/481 |
| 2023/0299013 A1* | 9/2023 | Bacha | H01L 24/32 257/737 |
| 2023/0395515 A1* | 12/2023 | Hsu | H01L 21/4857 |

* cited by examiner

*Primary Examiner* — Jack Chiang
*Assistant Examiner* — Brandon Bowers
(74) *Attorney, Agent, or Firm* — Muncy, Geissler, Olds & Lowe, P.C.

(57) ABSTRACT

A method of warpage-aware floorplanning for heterogeneous integration structure is proposed, which is executed by a computer, the method comprising using the computer to perform the following: performing a performing a layout partitioning to divide a layout into a plurality of grids; performing an initial floorplanning by assigning first geometric relations between a plurality of dies such that an effective material of each grid of the plurality of grids is determined; performing a global floorplanning to change the first geometric relations between the plurality of dies to second geometric relations to optimize warpage effect of the heterogeneous integration structure; and performing a detailed floorplanning to determine die order of placement based on material differences between the plurality of dies and an interposer.

20 Claims, 17 Drawing Sheets

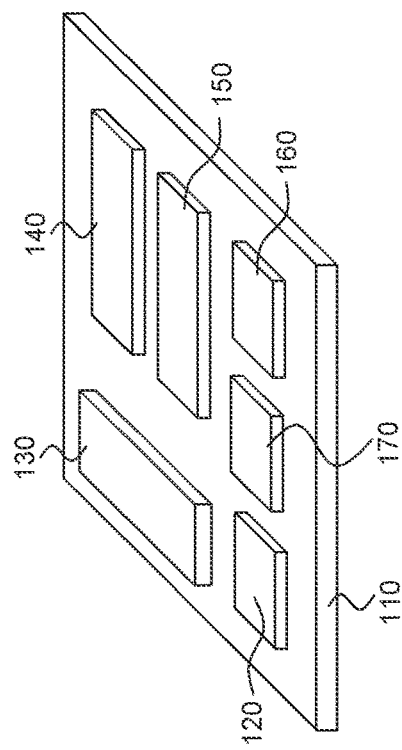
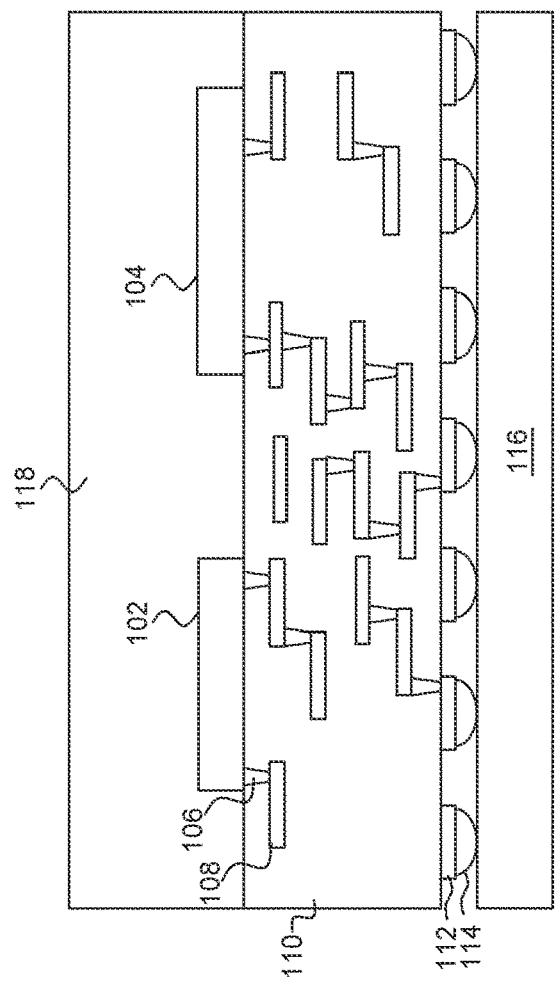
Fig.1B
Fig.1A

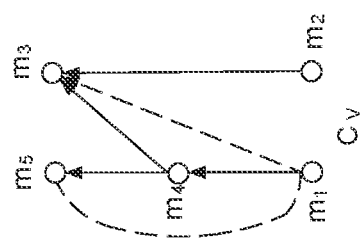
Fig.2B
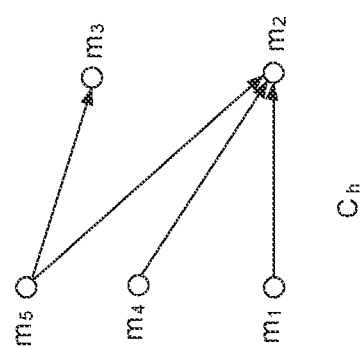
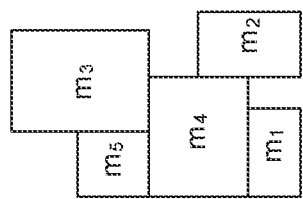
Fig.2A

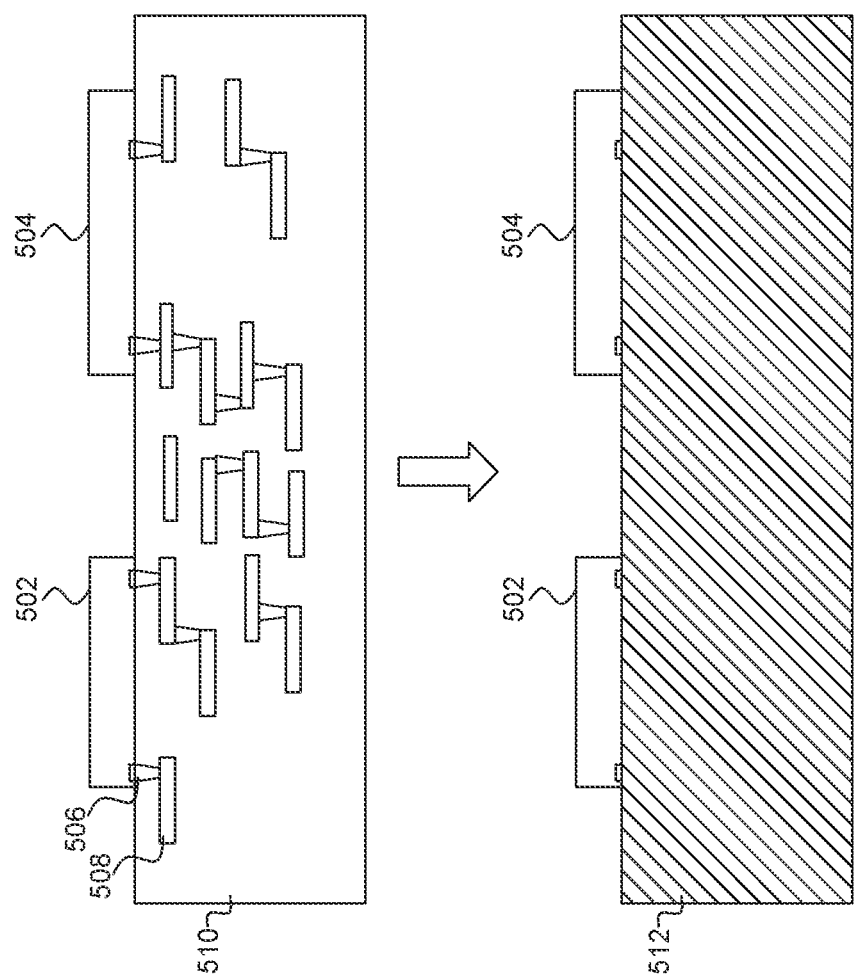

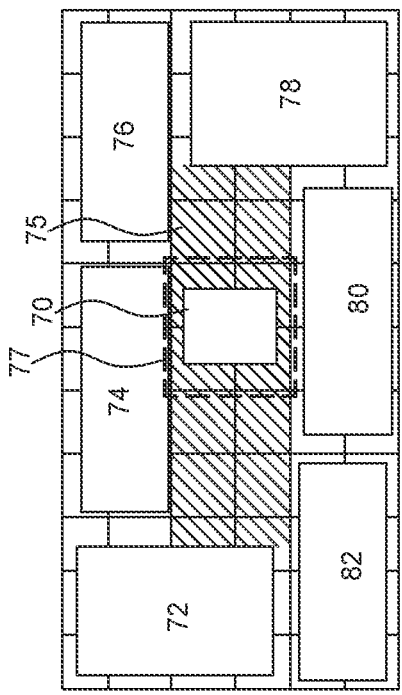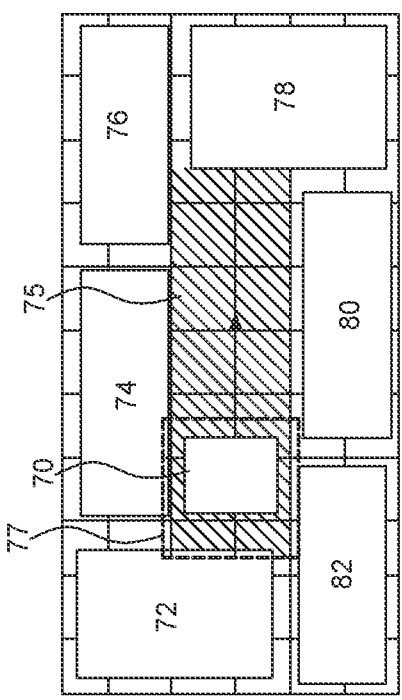
Fig.15

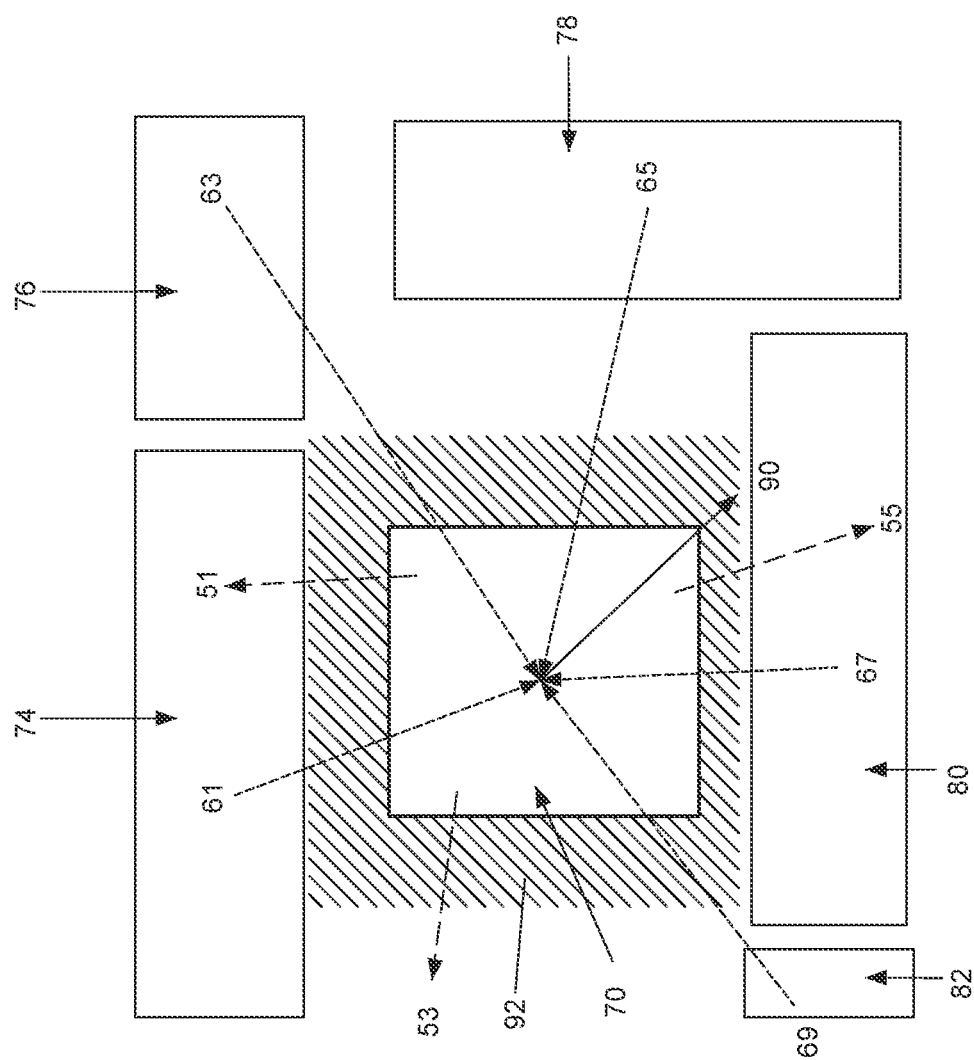

METHOD OF WARPAGE-AWARE FLOORPLANNING FOR HETEROGENEOUS INTEGRATION STRUCTURE

TECHNICAL FIELD

The present invention relates to a heterogeneous integration technique, and more particularly, to a method of warpage-aware floorplanning for heterogeneous integration structure.

BACKGROUND

In modern heterogeneous integration technologies, chips with different processes and functionality are integrated into a package with high interconnection density and large I/O counts. Integrating multiple chips into a package may suffer from severe warpage problems caused by the mismatch in coefficients of thermal expansion between different manufacturing materials, leading to deformation and malfunction in the manufactured package. The industry is eager to find a solution for the warpage optimization.

Heterogeneous integration technologies, such as integrated fan-out wafer-level packaging (InFO-WLP), provide small form factors, low cost, tight power budget, high electrical performance, and flexible integration. For example, the Apple Watch series leverages the advantages of InFO-WLP to integrate complex systems into a single package. Such heterogeneous integration often uses extra metal layers called redistribution layers (RDLs) to complete the interconnections between chips.

However, integrating multiple chips into a package may suffer from severe warpage problems caused by the mismatch in coefficients of thermal expansion (CTE) between different manufacturing materials, leading to deformation and malfunction in the manufactured package. The warpage effect has become a critical issue when integrating advanced heterogeneous packages (e.g., its 3D Fabric, including InFO, CoWoS, and SoIC technologies), and the industry is eager to find a solution for the warpage optimization, which is seldom considered in previous work and thus still lacking. No package-level floorplanners consider the warpage effect. Therefore, it is desirable to develop an effective and efficient warpage-aware floorplanner for advanced heterogeneous integration.

SUMMARY OF THE INVENTION

In this invention, the warpage-aware floorplanner with an efficient and effective warpage model is proposed. Three new perturbations are derived that can optimize the warpage effect more directly and effectively. The invention further proposes a detailed floorplanning algorithm that utilizes the dead spaces to optimize warpage and wirelength effectively.

The proposed floorplanning algorithm can achieve significantly better warpage costs. The proposed warpage model can predict the warpage trend accurately and efficiently and can be embedded into the cost function of a floorplanning engine.

The proposed new TCG perturbations can help optimize the warpage effect more directly and effectively. In contrast, the original perturbations aim for only area and wirelength optimization and cannot handle the warpage cost well. The detailed floorplanning algorithm can effectively leverage the dead spaces not been considered before for further optimization.

In this invention, a method for recognizing various analog circuit structures is proposed, which is executed by a computer, the method comprising using the computer to perform the following: performing a performing a layout partitioning to divide a layout into a plurality of grids; performing an initial floorplanning by assigning first geometric relations between a plurality of dies such that an effective material of each grid of the plurality of grids is determined; performing a global floorplanning to change the first geometric relations between the plurality of dies to second geometric relations to optimize warpage effect of the heterogeneous integration structure; and performing a detailed floorplanning to determine die order of placement of the plurality of dies based on material differences between the plurality of dies and an interposer.

According to one aspect, the plurality of grids have an identical size. A width and height of each grid of the plurality of grids is smaller than minimum width and height of the plurality of dies.

According to another aspect, the assigning some geometric relations between a plurality of dies comprises assigning horizontal and vertical relations between the plurality of dies to satisfy the die-to-die minimum distance. The global floorplanning includes three perturbations of peripheralization, matching and separation of dies.

According to one aspect, the method further comprises a fast simulated annealing based on TCG floorplan representation. The detailed floorplanning includes available dead spaces searching to find grids that best match a material coefficient of a target die by a sliding window, and a force-directed detailed position optimization. The out-of-die warpage cost is modeled as a repulsive force, and a vector from a location of a starting pin to that of a terminal pin is modeled as an attractive force. The all repulsive forces and attractive forces are summed up to obtain the total force to find a desired moving direction of the target die.

In the invention, a non-transitory computer-readable medium containing instructions is proposed, which when read and executed by a computer, cause the computer to execute a method of warpage-aware floorplanning for heterogeneous integration structure, wherein the method comprises the above-mentioned steps.

BRIEF DESCRIPTION OF THE DRAWINGS

The components, characteristics and advantages of the present invention may be understood by the detailed descriptions of the preferred embodiments outlined in the specification and the drawings attached:

FIG. 1A shows a side view and simplified structure of a heterogeneous package.

FIG. 1B shows a simplified floorplan structure of a heterogeneous package.

FIG. 2A shows a floorplan of five modules.

FIG. 2B shows its corresponding transitive closure graph of five modules.

FIG. 5 shows a side view and simplified structure of a heterogeneous package with a complex material simplified as an effective material.

FIG. 15 illustrates a sliding window searching for the desired matching grids in the available region.

FIG. 16 illustrates a total force determining the desired moving direction of the target die in the selected region.

DETAILED DESCRIPTION

Figure 3:
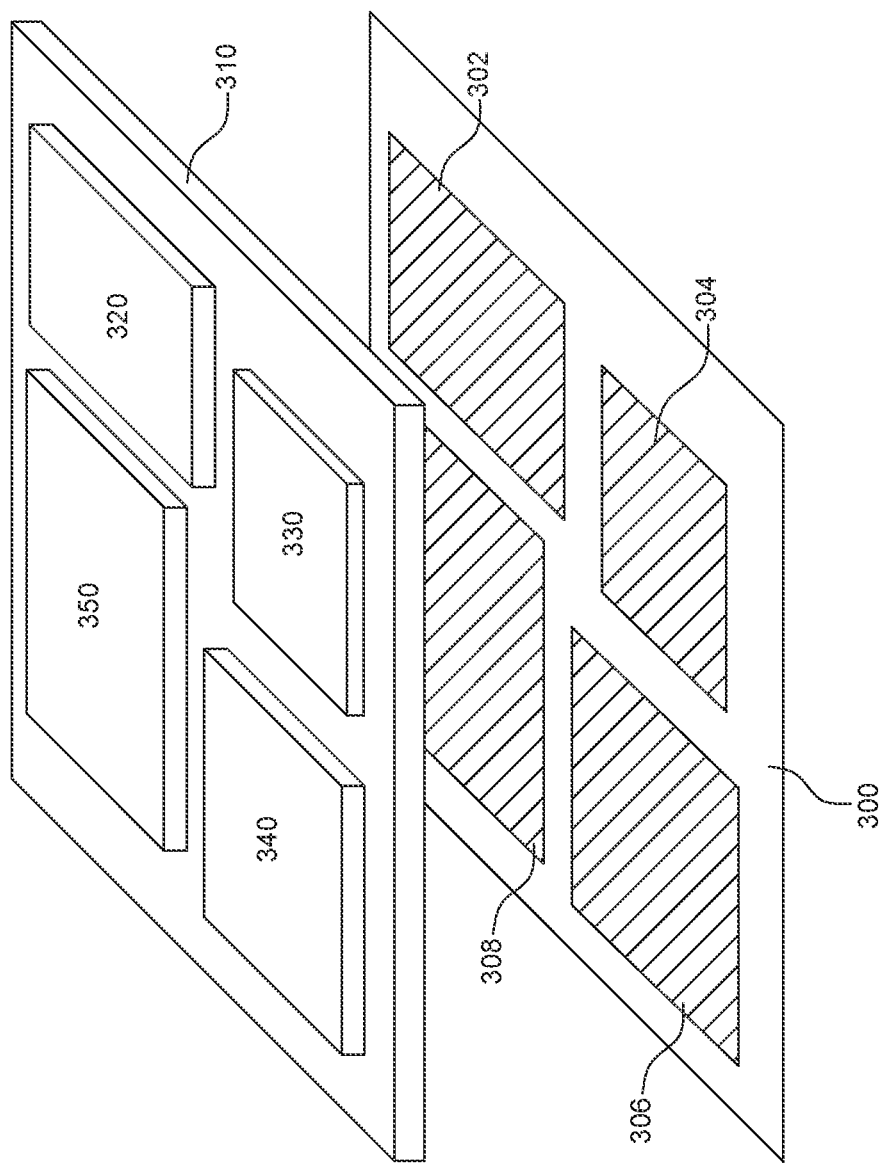
FIG. 3 illustrates a multi-chips InFO package including fan-in regions and fan-out region.

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

In this invention, the warpage-aware floorplanning algorithm is proposed for heterogeneous integration for 3D/2.5D IC packaging. Also, an efficient qualitative warpage model is proposed for a multi-chip package structure based on Suhir's solution, more suitable for optimization than the time-consuming finite element analysis. Besides, three perturbations for the transitive closure graph floorplan representation are then proposed to optimize the warpage more directly and can thus speed up the simulated annealing process. Finally, a force-directed detailed floorplanning algorithm is developed to further refine the results by utilizing the dead spaces. Embodiments of the present invention may be used in a variety of layout applications. Experimental results demonstrate the effectiveness of our warpage model and algorithm.

FIG. 1A shows a side view and simplified structure of a heterogeneous package. In a heterogeneous InFO package, chips with various processes are integrated together by the redistribution layers. The top part of the package are chips 102 and 104 protected by a molding compound 118. Under the chips, there are multiple RDLs composed of metal 108 and via 106 layers formed in an interposer 110. The RDLs in the interposer 110 are used to redistribute signal interconnections, and bump pads 112 and bump balls 114 are at the bottom of RDLs. These bump balls are attached to a printed circuit board (PCB) 116. FIG. 1B shows a simplified floorplan structure of a heterogeneous package. The package integrates various chips 120, 130, 140, 150, 160 and 104 with different process technologies (such as design rules of 7 nm, 14 nm, 10 nm, 7 nm, 7 nm and 5 nm, respectively) and functionalities, where RDLs in the interposer 110 are used to redistribute signals between chips to complete inter-chip connections.

In the following, a transitive closure graph (TCG) floorplanning representation is introduced, and the terminologies and notations used in this invention is given. And, the warpage model is proposed, the cost used in simulated annealing (SA) is defined, and the warpage-aware floorplanning problem is formulated.

The proposed floorplanner may be based on the TCG floorplan representation (please refer to: J.-M. Lin and Y.-W. Chang, "TCG: A transitive closure graph-based representation for non-slicing floorplans," in Proc. of ACM/IEEE DAC, 2001, pp. 764-769). TCG consists of two constraint graphs, a horizontal transitive closure graph $C_h$ and a vertical transitive closure graph $C_v$, modeling the geometric relations between all modules. TCG has three feasibility conditions as follows:

(1) $C_h$ and $C_v$ are acyclic.

(2) Each pair of nodes must be connected by exactly one edge either in $C_h$ or in $C_v$.

(3) The transitive closure of $C_h$ ($C_v$) equals $C_h$ ($C_v$) itself.

FIG. 2A gives a floorplan of five modules (devices) $m_1$, $m_2$, $m_3$, $m_4$, and $m_5$, and FIG. 2B shows its corresponding transitive closure graph (TCG). A directed edge in a TCG represent the geometric relation between two modules. For example, m is right to $m_5$ in the floorplan, so there is an edge from $m_5$ to $m_3$ in $C_h$ to describe the horizontal geometric relation. To obtain the corresponding floorplan of a TCG, packing operations on TCG can be performed, which can be computed in $O(|M|\lg|M|)$ time (please refer to: "TCG-S: orthogonal coupling of P*-admissible representations for general floorplans," IEEE TCAD, vol. 23, no. 6, pp. 968-980, 2004), where |M| is the number of modules.

The following terminologies and notations are used in the invention.

$M=\{m_i|1\le i\le |M|\}$ is the set of dies. A die is a rectangle with its height, width, CTE, Poisson's ratio, and elastic modulus, denoted by $h_i$, $w_i$, $\alpha_i$, $v_i$, and $E_i$, respectively. We let $(x_i, y_i)$ be the coordinate of the bottom-left corner of the die $m_i$.

$Q_i=\{q_i^j|1\le j\le |Q_i|\}$ is the set of all I/O pads in the die $m_i$. I/O pads are attached to the top RDL for chip-to-package contacts with an offset according to the bottom-left corner of die $m_i$, denoted as $(x_i^j, y_i^j)$.

$N=\{n_i|1\le i\le |N|\}$ is the set of inter-chip nets. All inter-chip nets are pre-assigned (PA) nets, each connecting two pre-specified I/O pads.

$P=\{(m_i, m_j)|m_i, m_j \in M, i\ne j\}$ is the set of adjacent die pairs, where $m_i$ and $m_j$ have either a horizontal or a vertical overlap and have transitive reduction edge in $C_h$ or $C_v$. An edge $(m_i, m_j)$ is a transitive reduction edge if there is no other path from $m_i$ to $m_j$, except $(m_i, m_j)$. In a physical layout, $m_i$ and $m_j$ abut each other.

For warpage-aware floorplan design, it first needs to model the warpage effect. The warpage model of the invention comprises four parts, in-die warpage cost, out-of-die warpage cost, effective material, and routing region estimation.

FIG. 3 shows a multi-chips InFO package including fan-in regions 302, 304, 306, 308 and fan-out region 300. The fan-in regions 302, 304, 306 and 308 are corresponding to the multi-chips 320, 330, 340 and 350, respectively.

Figure 4A:
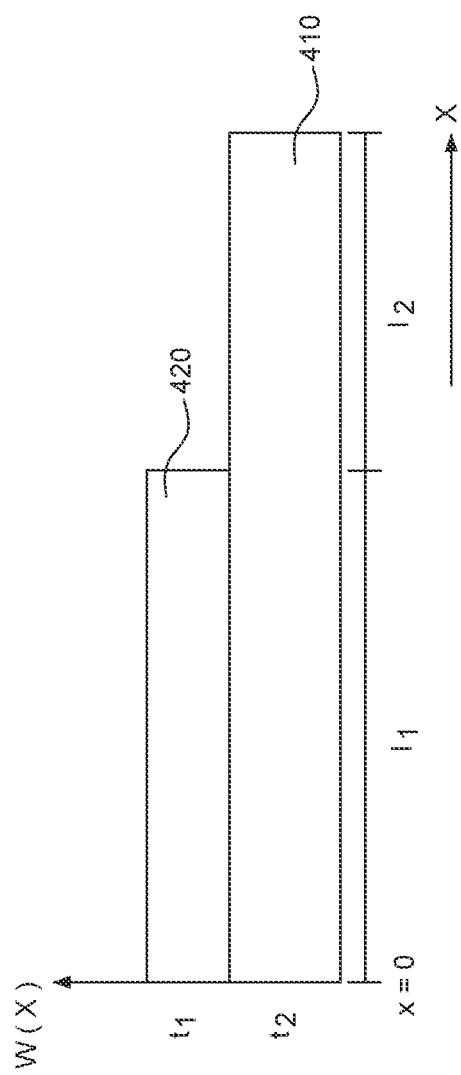
FIG. 4A shows a side view of a die-interposer structure.
Figure 4B:
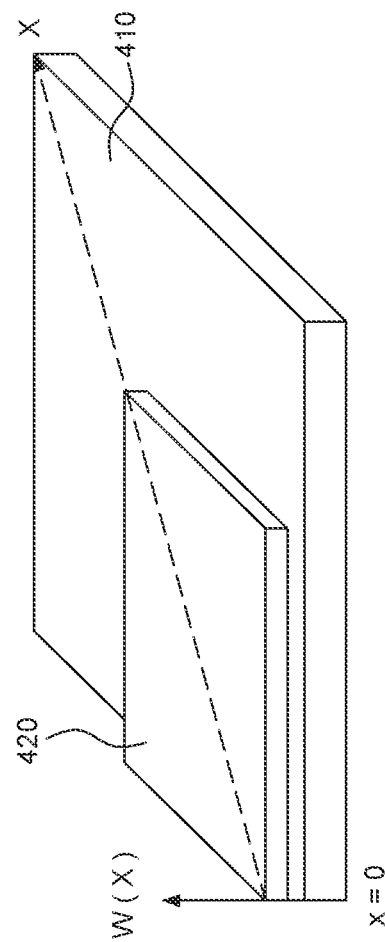
FIG. 4B shows a 3D view of a die-interposer structure.

In-Die Warpage Cost:

The in-die warpage cost is used to model the warpage effect in the fan-in region. FIG. 4A shows a side view of a die-interposer structure which a die 420 is packaged (attached) on an interposer 410, and FIG. 4B shows a 3D (three-dimension) view of the die-interposer structure. According to Suhir's modified theory (please refer to: M.-Y. Tsai and Y.-W. Wang, "A theoretical solution for thermal warpage of flip-chip packages," IEEE Trans. Compon.

Packag. Manuf. Technol., vol. 10, no. 1, pp. 72-78, 2019), the curvature of the fan-in region of the structure shown in FIG. 4A, can be expressed as follows:

$$w_{in}''(x) = \frac{1}{\rho(x)} = \frac{t\Delta\alpha\Delta T}{2\lambda D}(1 - \frac{\cosh kx}{\cosh kl})$$

where x is the distance to the left corner of the package, $\rho(x)$ is the radius of the curvature, t is the thickness of the structure, $\Delta\alpha$ is the CTE difference between a die and an interposer, $\Delta T$ is the temperature difference between the initial temperature and the final temperature, and k, D, $\lambda$ are material related coefficients. By integrating the curvature two times, the warpage formula can be derived as follows:

$$w(x) = \frac{t\Delta\alpha\Delta T}{2\lambda D}(\frac{1}{2}x^2 - \frac{\cosh kx - 1}{k^2 \cosh kl})$$

For warpage-aware floorplan optimization, it needs an efficient, yet sufficiently accurate model for the warpage effect. Further, it suffices to develop a warpage model that can capture the trend of the warpage effect for floorplan optimization. As a result, the warpage formula can be further simplified by omitting the cos h term to substantially improve its efficiency. In this way, the remaining term become an upper bound of the original formula because (cosh kx−1)>0. Also, the simplified formula is positively proportional to $(t\Delta\alpha\Delta T/\lambda D)x^2$, easy to compute. To justify the simplified model, an experiment is performed to be detailed in the following. The results show that the simplified formula generates warpage values 5% larger than those from the original formula and 23.8% differences from those by a finite element tool. More importantly, the simplified formula conforms to the warpage trend of the finite element tool. Therefore, the proposed simplified model is sufficiently accurate for the optimization purpose addressed in this invention. As a result, the in-die warpage cost is defined as follows:

$$\text{Cost}_{in}(i) = \frac{t_i \Delta\alpha_i \Delta T_i}{\lambda_i D_i} A_i$$

where A is the die size.

Out-of-Die Warpage Cost:

The out-of-die warpage cost is used to evaluate the warpage effect in the fan-out region. According to Suhir's modified solution, the curvature of the fan-out region is as follows:

$$w''_{out}(x) = -v_{int} w''_{in}(0)$$

where $v_{int}$ is Poisson's ratio of the interposer. The warpage effect in the fan-out region can be induced by multiple dies in adjacent regions. All pairs of dies ($m_i$, $m_j$)$\in$P are considered. If the warpage effect induced by two dies is reversed, the warpage can be canceled out. As a result, the out-of-die warpage cost can be derived as follows:

$$\text{Cost}_{out}(i,j) = \frac{t_i \Delta\alpha_i \Delta T_i}{\lambda_i D_i} + \frac{t_j \Delta\alpha_j \Delta T_j}{\lambda_j D_j}$$

Effective Materials:

Since an advanced package often contains complex materials, its warpage computation can be highly complicated and time-consuming, not desirable for optimization computation. As a result, the effective material concept may be used to simplify the computation of complex materials. FIG. 5 shows a side view and simplified structure of a heterogeneous package. Multiple chips 502, 504 (others chips not shown) are attached on an interposer 510. Under the chips, there are multiple RDLs composed of metal 508 and via 506 layers formed in the interposer 510. As shown in FIG. 5, a complex material is simplified as an effective material 512 by computing the volume-weighted average. For example, the effective CTE can be calculated as follows:

$$\alpha_{eff} = \frac{\int \alpha(x,y,z)dv}{V}$$

The computation of other effective material coefficients such as Poisson's ratio (v) and elastic modulus (E) is similar.

Routing Region Estimation:

Interconnections among dies could affect the warpage. Since routes are not determined during floorplanning, the final routing is needed to estimate to compute the effective material. The Retangular Uniform Wire Density (RUDY, please refer to: P. Spindler and F. M. Johannes, "Fast and accurate routing demand estimation for efficient routability-driven placement," in Proc. of ACM/IEEE DATE, 2007, pp. 1-6) is used to estimate the routing demand and combine the effective material concept to estimate the metal distribution (wire density) of the whole package. RUDY has been proven efficient and accurate for predicting a routing demand, which estimate the effective material after each perturbation efficiently. Further, the routing demand can be updated incrementally, which can accelerate the floorplanning process.

Figure 6:
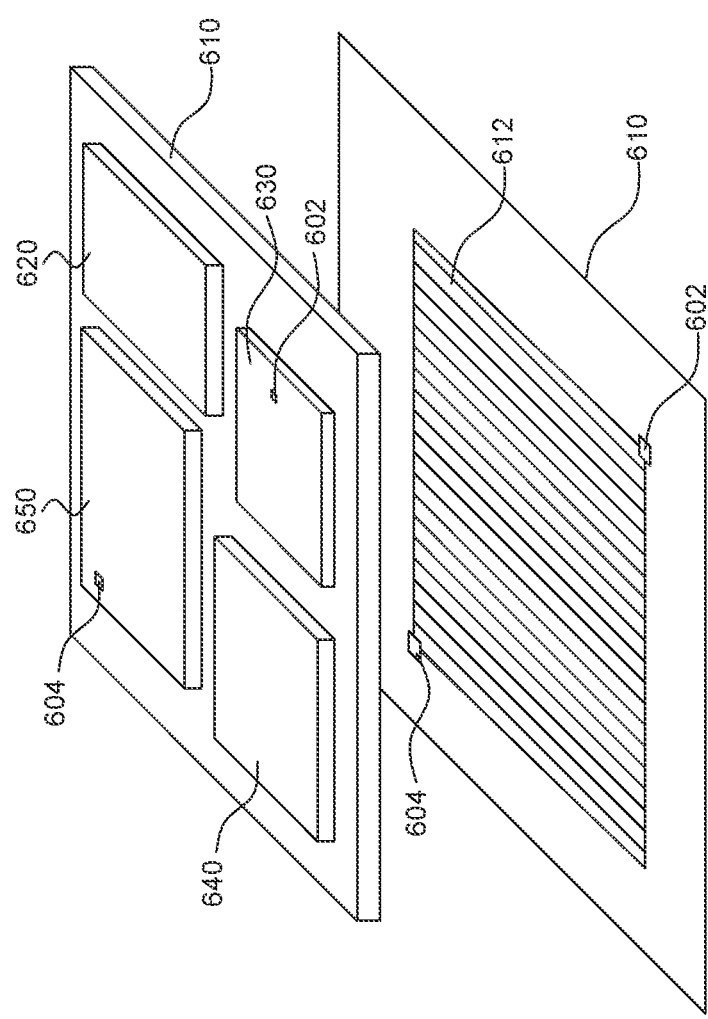
FIG. 6 illustrates a routing region estimation.

As shown in FIG. 6, the routing demand of a net is estimated to be uniformly distributed in the bounding box of all the pins of the net. Multiple chips 620, 630, 640 and 650 are attached on an interposer 610. The area 612 surrounded by two pins 602, 604 will provide a net metal density in this area. The effective material of each region can be obtained after all net calculations are completed.

Simulated Annealing Cost:

A simulated annealing (SA) is applied for the floorplan design. For a floorplan F, its area, wirelength, in-die warpage cost, and out-of-die warpage cost, detailed are considered as follows:

A is the area of the floorplan.

$$A = \max(x_i + w_i) \times \max(y_j + h_j)$$

L is the total half perimeter wirelength (HPWL) of all nets.

$$L = \sum_{n_i \in N} HPWL$$

$W_{in}$ is the total in-die warpage cost.

$$W_{in} = \sum_{m_i \in M} |\text{Cost}_{in}(i)|$$

$W_{out}$ is the total out-of-die warpage cost for all the out-of-die costs of adjacent die pairs in P.

$$W_{out} = \sum_{(m_i,m_j) \in P} |\text{Cost}_{out}(i,j)|$$

For the 2.5D/3D IC packaging structure, as shown in FIG. 1B, it needs to consider the design rule of minimum spacing between two dies. As a result, the invention's floorplanning can be formally defined as follows. The warpage-aware floorplanning for 2.5D/3D IC packaging includes the following: given design rules, a set of dies, a set of I/O pads, and a set of netlists which are input, placing all the dies on a layout such that the maximum warpage, the total wirelength, and the package size are minimized while no design rules are violated. A floorplan result is output. The constraints of die-to-die minimum distance are satisfied.

Figure 7:
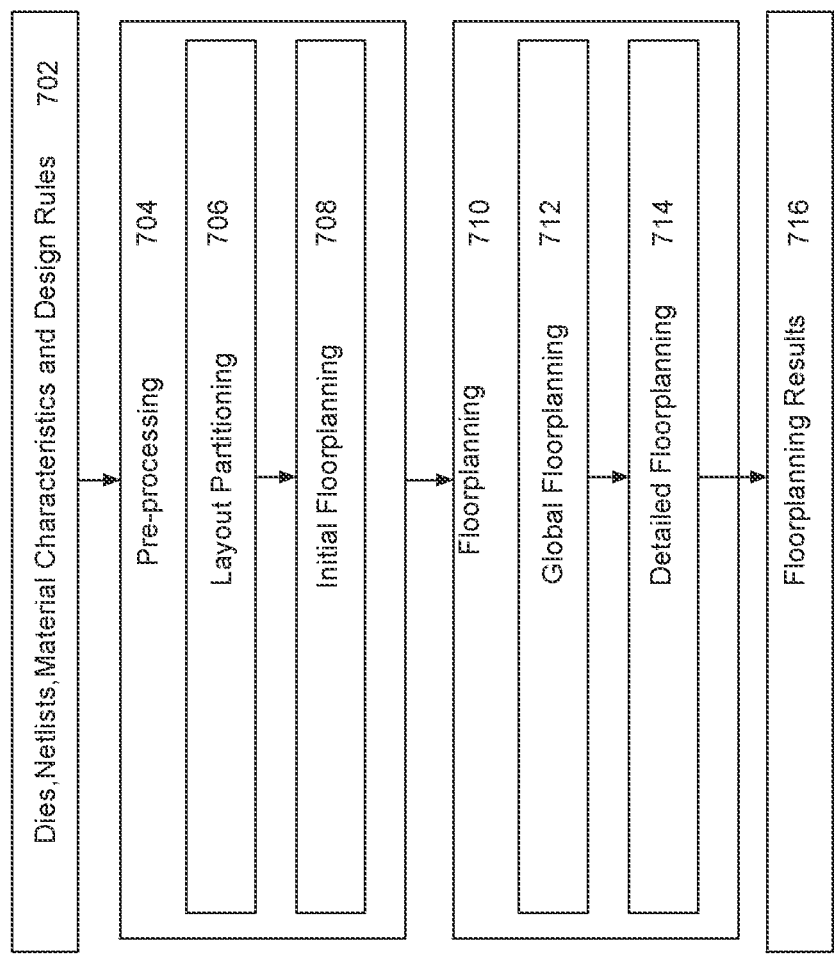
FIG. 7 shows an algorithm flow of a method of warpage-aware floorplanning for a heterogeneous integration structure.

In this invention, an overview of the floorplanning flow is provided and then the methods in each stage are described. A method of warpage-aware floorplanning for a heterogeneous integration structure is shown in FIG. 7, and the algorithms include two stages, preprocessing and floorplanning. The floorplanning stage can be divided into two sub-stages: global floorplanning and detailed floorplanning.

Firstly, in step 702, design rules, a set of dies, a set of I/O pads, material characteristics and a set of netlists is given, placing all the dies on a layout. For example, the netlist may be described in a Simulation Program with Integrated Circuit Emphasis (SPICE) format, and the design constraints are annotated into the netlist. In preprocessing of the step 704, it divides the layout into small grids. After a layout partitioning, an initial floorplan is generated and then analyze the material in each grid and compute the effective material coefficients. In global floorplanning, SA is adopted to find the floorplan for dies with minimized cost. Detailed floorplanning fine tunes the positions of dies locally. For each die, its feasible region is determined and its desired location is found.

Figure 8:
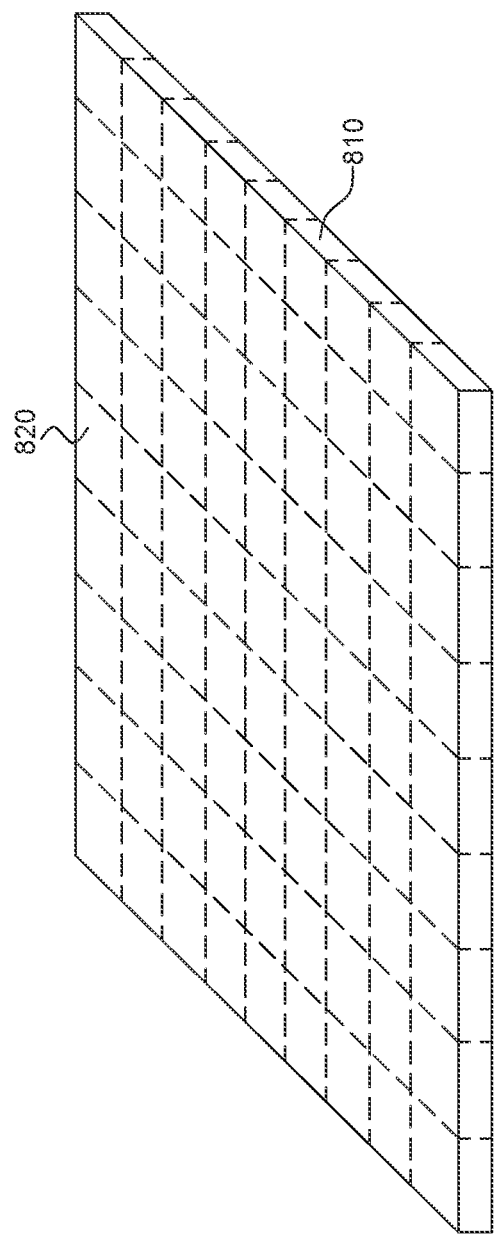
FIG. 8 illustrates a layout partitioning.

In the step 706, it performs a layout partitioning to divide a layout 810 into small grids 820, shown in FIG. 8. The grid size is decided by the die number, die size, and trade-offs between model accuracy and efficiency. Then, an initial floorplan is generated, and the effective material of each small grid can be calculated.

For the step 706, an interposer 810 is partitioned into a plurality of grids 820 of the same size ($L_G$) to reduce the warpage computation time. For more accurate routing demand estimation, the width/height (w/h) of a grid must be smaller than the minimum width/height of all dies. If the grid size is too large, its corresponding complex material might be over simplified, reducing the accuracy of our simplified model. On the other hand, if the grid size is too small, the proposed model will suffer from high computation time. The trade-off between accuracy and efficiency is considered. Therefore, the constraints can be described as follows between accuracy and efficiency is considered. Therefore, the constraints can be described as follows.

$$w_{min} = \min(w_i), \forall 1 \leq i \leq |M|$$

$$h_{min} = \min(h_i), \forall 1 \leq i \leq |M|$$

$$L_G = \min(w_{min}, h_{min})$$

Figure 9:
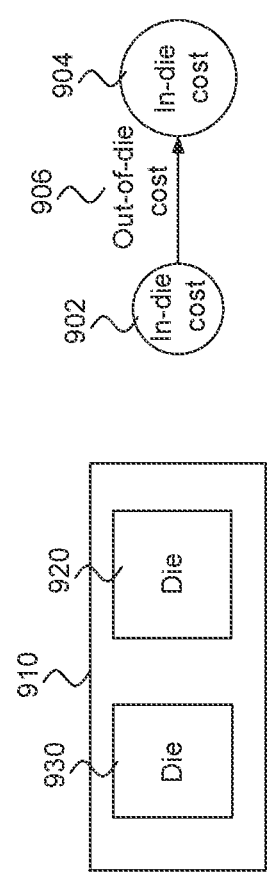
FIG. 9 illustrates a layout and in-die cost and out-of-die cost.

The floorplan topology greatly influences the warpage effect. The warpage around a die is determined by the geometric relations between its adjacent dies. Since TCG records the geometric relationship between all dies in its graphs directly, this transparent characteristic facilitates the warpage optimization. In contrast, other floorplan representations, such as B*-tree and Sequence Pair, need extra packing processing to identify the geometric relationship between dies, thus less suitable for warpage-aware floorplanning. Further, the warpage effects can be easily modeled in a TCG, where an in-die cost can be modeled as a node cost, and an out-of-die cost as an edge cost. For example, a layout 910 includes a die 920 and a die 930, an in-die cost 902, an in-die cost 904 and an out-of-die cost 906 is generated, shown in FIG. 9. By identifying the effects of various geometric relations, specific perturbations can be derived to optimize warpage more directly and effectively.

Figure 10A:
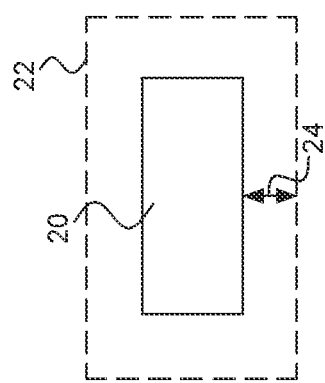
FIG. 10A illustrates a ½ die-to-die minimum distance.
Figure 10C:
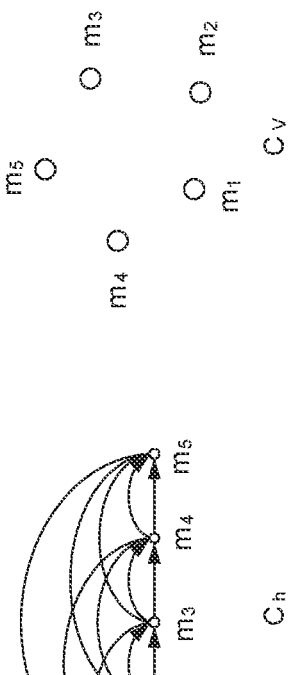
FIG. 10C illustrates a transitive closure graph.
Figure 10B:
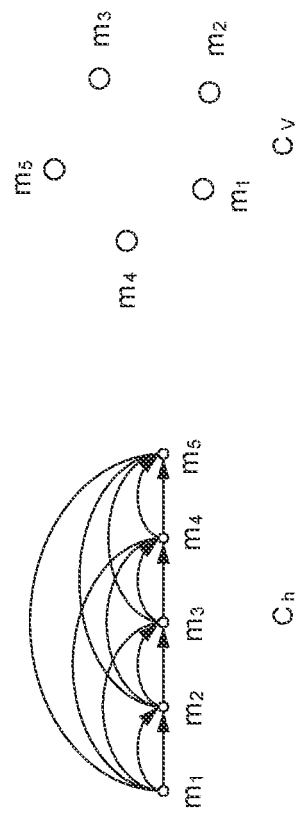
FIG. 10B illustrates a layout with extreme aspect ratio.

In initial floorplanning of the step 708, an initial floorplan is generated by assigning some geometric relations between all dies. Therefore, the effective material of each small grid can be calculated. By evenly assigning the horizontal and vertical relations between dies, the dies are inflated on four sides to satisfy the die-to-die minimum distance so that can avoid an initial floorplan with an extreme aspect ratio. The dies are inflated on four sides to satisfy the die-to-die minimum distance constraints. As shown in FIG. 10A, a die 20 is inflated on four sides (to a box 22) to satisfy the to satisfy the die-to-die minimum distance (½ die-to-die minimum distance 24). FIG. 10B shows a layout with extreme aspect ratio. When all relationships between dies (modules $m_1$, $m_2$, $m_3$, $m_4$, $m_5$) are horizontal, all the dies will be arranged in a straight line, which is hard to be optimized later. FIG. 10C show a horizontal transitive closure graph $C_h$ and a vertical transitive closure graph $C_v$. After the position of each die is determined, the routing demand estimation and the effective material coefficients are evaluated.

After preprocessing, the step 710 of floorplanning stage can be divided into two sub-stages: the step 712 of global floorplanning and the step 714 of detailed floorplanning. The proposed TCG-based warpage-aware floorplanning is performed by using SA. The initial floorplan generated from preprocessing is perturbed to find new solutions. Therefore, new perturbations that satisfy the TCG feasibility conditions are further developed and warpage can be optimized more directly and efficiently.

In the step 712 of global floorplanning, three new perturbations for TCG-based floorplanning are provided to optimize the warpage effect more directly. These new perturbations focus on changing the geometric relation of certain dies. The main idea is that a die with a large material coefficient difference from the interposer should not be placed at the center of the package because it will affect more dies when placed at the center of the package. Directly changing the geometric relation of those dies can speed up the process to find the desired floorplan solution. The proposed invention elaborates the three new perturbations, namely, Peripheralization, Matching, and Separation, as follow.

Figure 11:
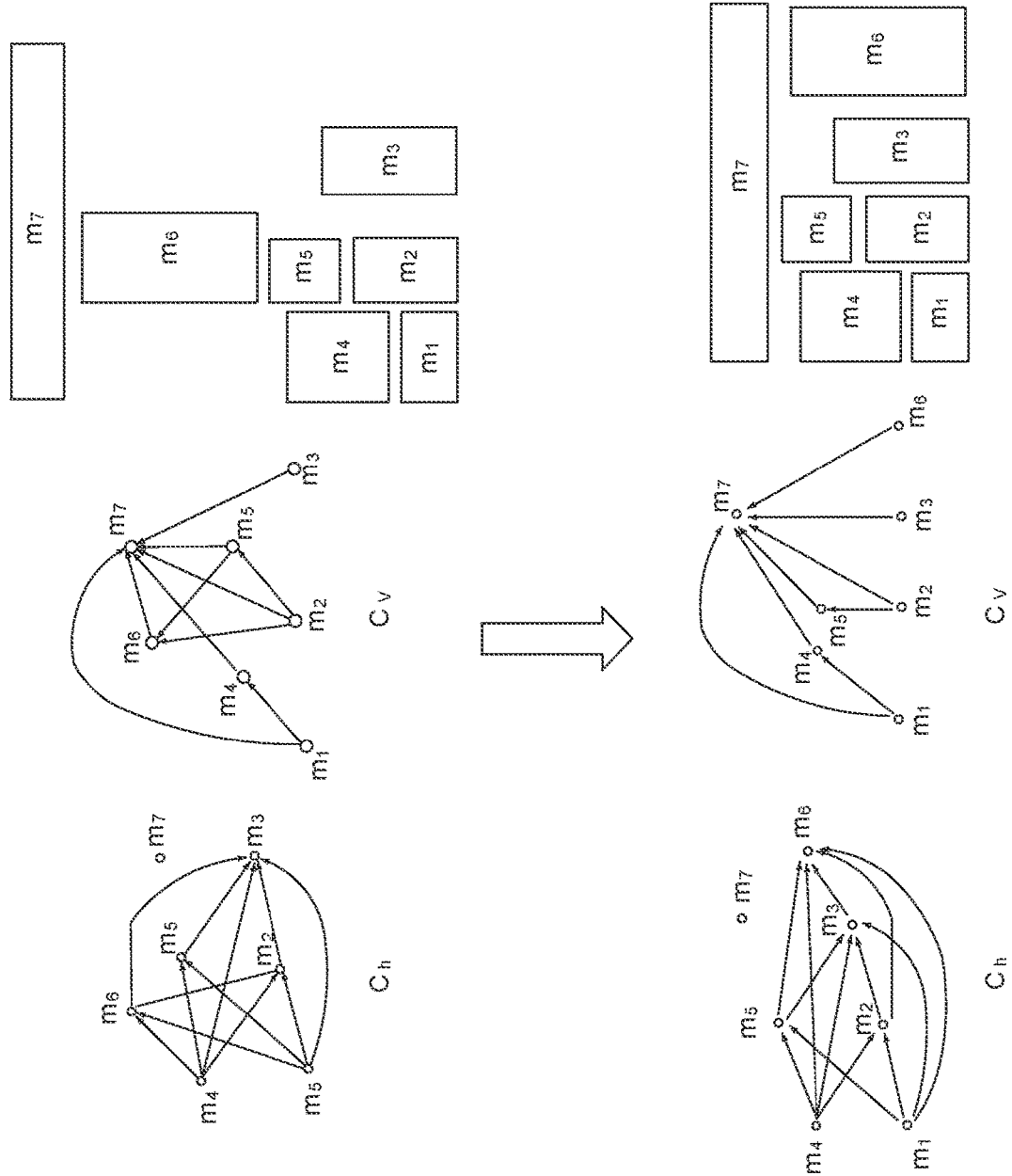
FIG. 11 illustrates TCG and floorplan after peripheralizing.

In the Step of Peripheralization:

Peripheralization moves the node associated with a die to the start or end of $C_h$ or $C_v$, i.e., a position with zero in-degree or out-degree, respectively. In this way, a die with a high warpage cost can be moved to a boundary of the package to reduce its induced out-of-die cost with other dies. To peripheralize the die $m_i$, it needs to select another die $m_j$ whose corresponding node in $C_h$ and $C_v$ has zero in-degree or out-degree. After selecting the die $m_j$, all edges in $C_h$ and $C_v$ associated with $m_i$ are removed. Then, the geometric relations of $m_j$ and other dies are inherited by $m_i$. It also adds a new corresponding edge from $m_i$ to $m_j$ ($m_j$ to $m_i$), if mj corresponds to a start (end) node before peripheralization. As shown in top of FIG. 11, which shows an initial TCG and floorplan, $m_6$ is at the center of the original floorplan. After peripheralization, $m_6$ is moved to the right side of $m_3$, a boundary of the package, and the resulting $C_h$, $C_v$, and floorplan are shown in bottom of FIG. 11. It peripheralize $m_6$. Note that the new edge of $m_i$ is inherited from $m_j$, and the newly added edge from $m_i$ to $m_j$ or from $m_j$ to $m_i$ only appears in either $C_h$ or $C_v$. As a result, the three TCG feasibility conditions are satisfied for peripheralization.

Figure 12:
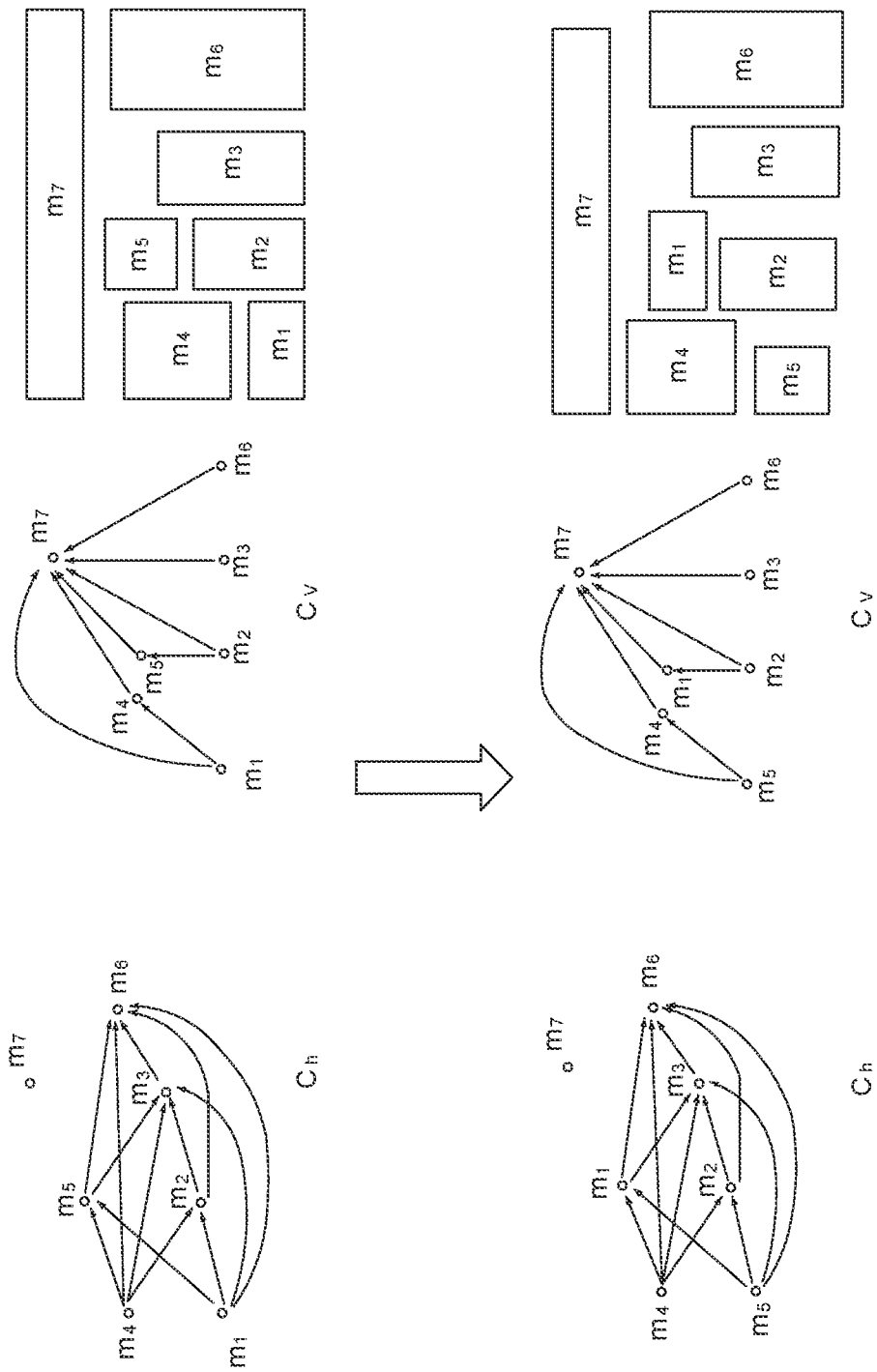
FIG. 12 illustrates TCG and floorplan after matching.

In the Step of Matching:

Matching swaps two dies with similar sizes in both $C_h$ and $C_v$. In a layout, it aims to swap two dies without significantly affecting the rest of the package. The original TCG swap perturbations randomly swap two dies; however, swapping two dies with a big difference in size may cause too much movements of other dies, not desirable for warpage cost convergence. For matching, a die $m_i$ is first selected. Then, for all dies, the die $m_j$ with a similar size and similar aspect ratio to $m_i$ is chosen. If there are multiple candidates, the candidates are sorted by the warpage cost variation after exchanging two dies. The candidate that can reduce more costs gets the priority. Finally, $m_i$ and $m_j$ are swapped by exchanging two corresponding nodes in both $C_h$ and $C_v$. As shown in top of FIG. 12, $m_1$ and $m_5$ are similar in size. After matching, the two dies are swapped, and the resulting $C_h$, $C_v$, and floorplan are shown in bottom of FIG. 12. The matching perturbation is a special version of swap, so the three feasibility conditions are satisfied for matching.

Figure 13:
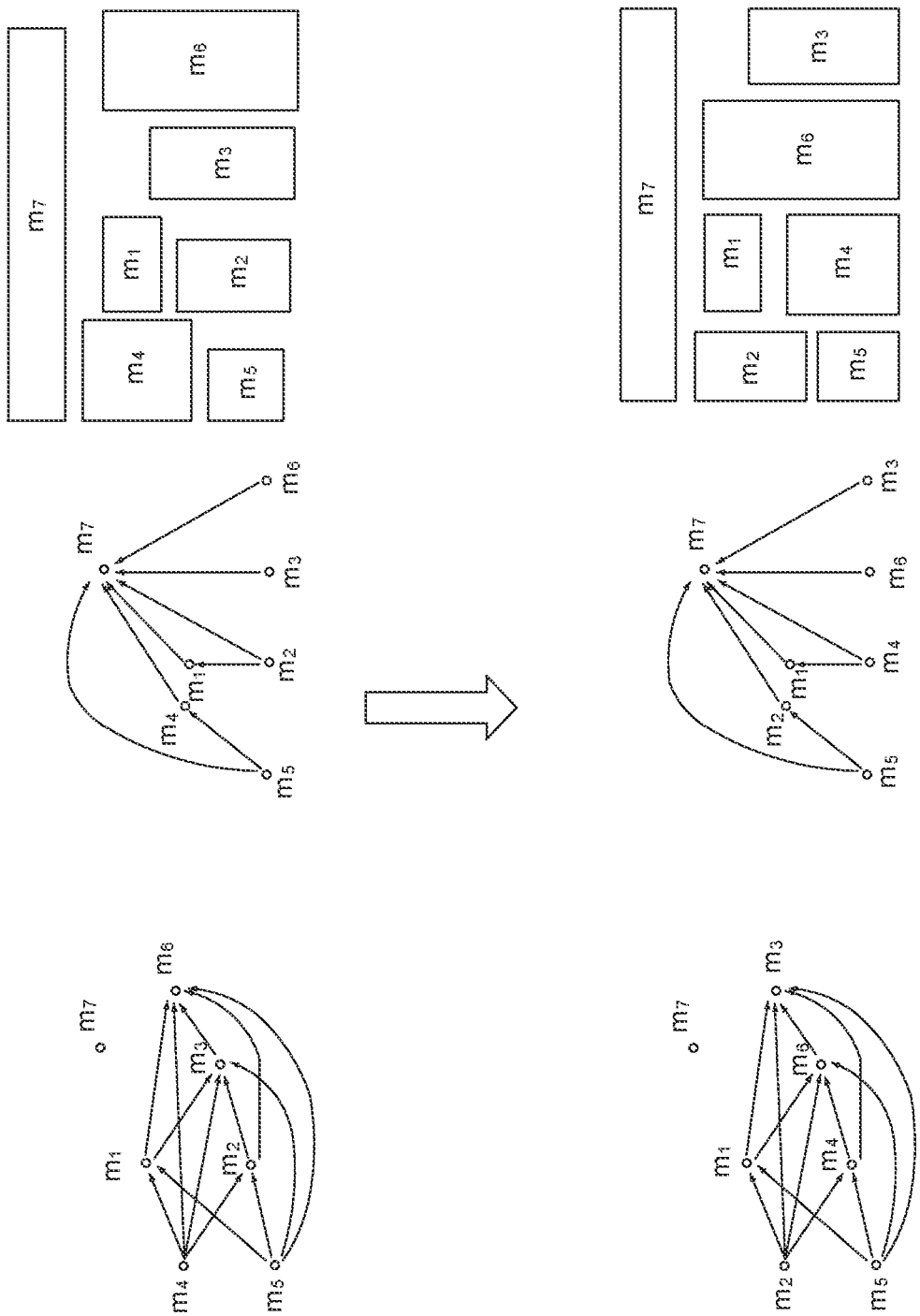
FIG. 13 illustrates TCG and floorplan after separating.

In the Step of Separation:

Separation removes the adjacency relation between adjacent a die pair $(m_i, m_j) \in P$ in both $C_h$ and $C_v$. In a layout, two dies are separated apart. This perturbation aims to separate two dies that should not be placed together, such as those incurring a large out-of-die warpage cost. For separation, a die $m_i$ is first selected. Then, for all adjacent dies of $m_i$, which are sorting by the out-of-die warpage costs with $m_i$ in descending order. The die with a larger out-of-die warpage cost gets the priority of being selected. After two dies are selected, $m_i$ and $m_j$ with another two nonadjacent dies are swapped. As shown in top of FIG. 13, $m_2$ and $m_3$ are adjacent. After separation, $m_2$ and $m_3$ are separated, and the resulting $C_h$, $C_v$, and floorplan are shown in bottom of FIG. 13. Separation is a combination of two swap perturbations, so the three feasibility conditions are satisfied for separation.

Fast Simulated Annealing:

Simulated annealing (SA) has been proven an effective and efficient algorithm for floorplanning. Further, fast SA provides a fast convergence scheme for SA. As a result, the invention develops a fast SA algorithm based on the TCG floorplan representation. By adjusting the parameters in different stages of the fast SA, the optimization trade-offs between different costs can be balanced more effectively. Besides the area and wirelength, the in-die warpage and out-of-die warpage costs are added into the proposed cost function. To balance the different costs more effectively, each cost is normalized by its corresponding cost in the best floorplan found so far. The cost function of a given floorplan F is defined as follows:

$$\Phi(F) = \frac{\alpha_A A^* + \alpha_L L^* + \alpha_{in} W_{in}^* + \alpha_{out} W_{out}^*}{\alpha_A + \alpha_L + \alpha_{in} + \alpha_{out}}$$

Where $A^*$, $L^*$, $W^*_{in}$, and $W^*_{out}$ are the normalized area, wirelength, in-die warpage, and out-of-die warpage cost with respect to the best floorplan, respectively. Here, $\alpha_A$, $\alpha_L$, $\alpha_{in}$, and $\alpha_{out}$ are weights of the costs adjusted dynamically in the SA process.

To obtain the desired solution, the cost weights and the probability of choosing different perturbations in different stages are adjusted. The fast SA is composed of three stages, high-temperature random search, pseudogreedy local search, and hill-climbing search. Since the area and warpage are more critical for package design, the two costs in high-temperature random search are focused more. As a result, the weights of the two costs are set larger in this stage. Then, for pseudo-greedy local search, which accepts a small number of inferior solutions, a larger weight for wirelength is applied to reduce it without significantly changing the floorplan. For hill-climbing search, however, it shows that the warpage cost is usually stuck in a local optimal and is hard to be optimized more. To further improve the warpage cost, the probability of choosing a new perturbation is increased. By using the new perturbations, it can escape from a local optimal for the warpage cost and find a better solution.

After the step 712 of global floorplanning, there could be dead spaces between dies, which are useful for further optimization. It mainly focuses on optimizing the warpage effect in this stage because the geometric relations of all dies are already determined. Followed by the step 714 of the detailed floorplanning, the die order according to the material coefficients and the material distribution of the interposer is first determined. Then, a force-directed detailed floorplanning algorithm is developed to find the desired position of a die locally.

Figure 14:
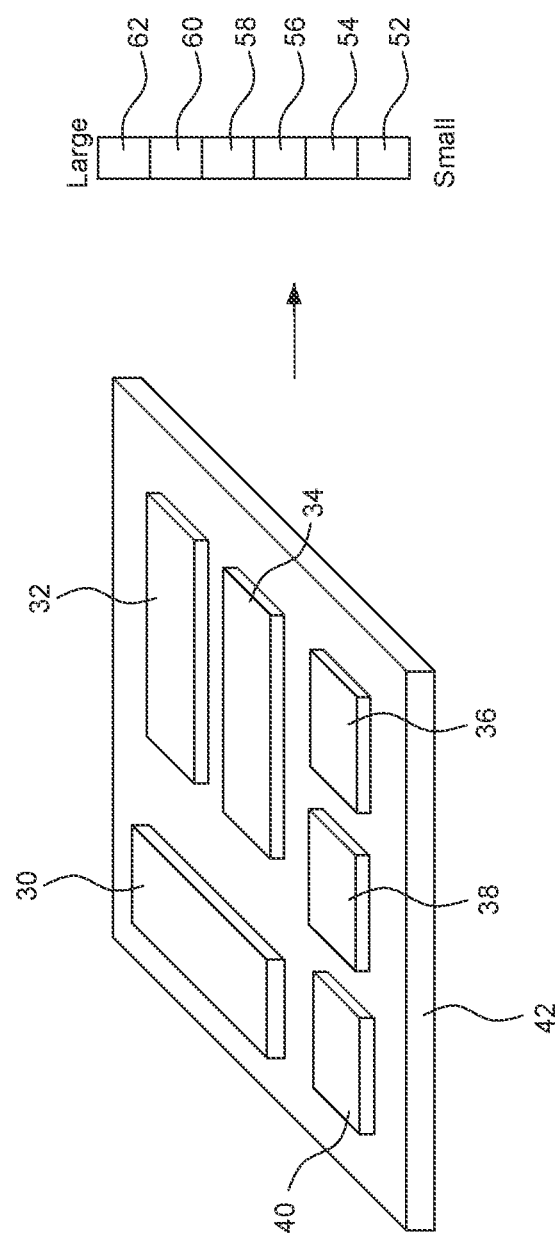
FIG. 14 illustrates a greedy method for die order determination.

Die Order Determination:

A greedy method is used to determine the die order. For each die, the material difference with the interposer is calculated. Then, the dies are sorted by the material differences with the interposer in descending order. The die order of placement can be determined based on material difference between a plurality of dies and an interposer. For example, as shown in FIG. 14, which shows a greedy method for die order determination, the material difference of the dies 30, 32, 34, 36, 38 and 40 with an interposer 42 are calculated, and the larger material difference 62 is on the top and followed by the material difference 60, 58, 56, 54, 52 and 50 in descending order which is corresponding to the dies 30, 32, 34, 36, 38 and 40, respectively. Dies with a larger material difference with the interposer gets the priority to be optimized first because these dies have larger rooms for warpage optimization.

Available Dead Spaces Searching:

For a target die $m_i$, the available dead spaces are searched for optimization. To search for such available dead spaces, its adjacent dies $m_j$ are first checked, $(m_i, m_j) \in P$, and the dead spaces along the direction from the target die to the adjacent one is found. Taking the union of those dead spaces, all useful dead spaces for the target die can be found for further optimization. For example, in FIG. 15, a target die 70 has adjacent dies 72, 74, 76, 78, 80 and 82, and a shaded region 75 is the available region. Grids that best match the material coefficient of the target die are searched by a sliding window 77, which is inflated on four sides of the target die 70. The arrow indicates that the sliding window 77 is searching for the desired matching grids in the available region 75. Then, the sliding window 77 finds the desired matching grids, selected region.

Force-Directed Detailed Position Optimization:

After the available dead spaces are determined, the grids are first selected to place the die. The sliding window 77 is used to search for grids that best match the material coefficient of the target die 70, as shown in FIG. 15. The best matching grid region 92 is defined, as the shaded region shown in FIG. 16. Then, a force-directed detailed floorplanning algorithm is applied. The warpage effect with adjacent dies and the terminal pin location of the die are considered. The out-of-die warpage cost is modeled as a repulsive force, and the vector from the location of a starting pin to that of a terminal pin is modeled as an attractive force. It aims to pull the dies away from other adjacent dies inducing a large warpage effect, and push the die to the terminal pin location to reduce the wirelength. As shown in FIG. 16, there are repulsive forces 61, 63, 65, 67 and 69 pointing from the center of adjacent dies to that of the target die 70. Also, there are attractive forces 51, 53 and 55 pointing from the locations of starting pins to those of terminal pins. By summing up all the repulsive forces fr and attractive forces fa, we can obtain the total force f. The direction of this force is the desired moving direction of the target die 70. The total force is modeled as follows:

$$f = \alpha_r \Sigma f_r + \alpha_a \Sigma f_a$$

where $\alpha_y$ and $\alpha_\alpha$ are weights to adjust the trade-offs between wirelength and warpage. After all dies are optimized, the final solution is obtained.

The proposed floorplan algorithm is implemented in the C++ programming language on an Intel Xeon 3.40 GHz Linux workstation with 64G memory. In TCG-based fast SA, the LEDA is used to package for graph operation (please refer to LEDA: the library of efficient data types and algorithms. [Online]. Available: https://www.algorithmic-solutions.com/). For finite element analysis, the modern Moldex3D finite element tools are used (please refer to: Moldex3D: Plastic injection molding simulation software. [Online]. Available: https://www.moldex3d.com/). The finite element analysis is a common method to analyze the warpage effect accurately. For the experiments, Moldex3D is used to simulate the warpage effect. Since there are no existing benchmarks or related data for warpage-aware floorplanning, benchmarks are generated by simulating the industrial SiP designs and previous works (with similar die numbers and net numbers) to justify the effectiveness of our algorithm. Also, we assigned the material coefficient of each die based on real industrial designs. Totally, five benchmark circuits were constructed, and their statistics are listed in Table 1, where |M| and |N| represent the number of dies and the number of two-pin nets, respectively.

TABLE 1

| Circuit | |M| | |N| |
| --- | --- | --- |
| Warpage1 | 9 | 261 |
| Warpage2 | 10 | 388 |
| Warpage3 | 12 | 530 |
| Warpage4 | 15 | 764 |
| Warpage5 | 20 | 1058 |

Figure 17B:
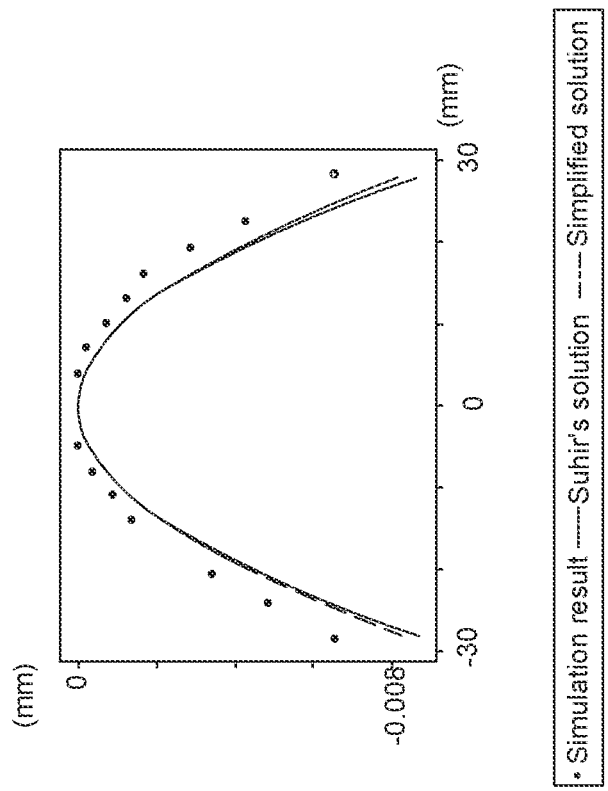
FIG. 17B illustrates simulation results of Suhir's solution, the invention's warpage model, and the finite element tool.
Figure 17A:
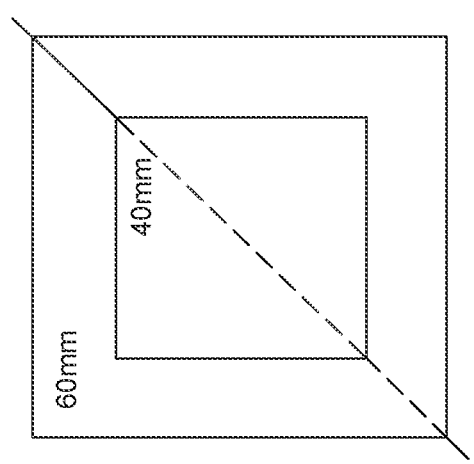
FIG. 17A illustrates a top view of a die-interposer structure for simulation.

To justify the accuracy of the proposed warpage model, the invention's model is compared with Moldex3D. The invention performed the experiment on a die-interposer structure, as shown in FIG. 17A. The result is shown in FIG. 17B which shows the proposed model matches Suhir's solutions and keeps the similar warpage trend as the finite element tool. The x-axis gives the distance to the center of the package, and the y-axis gives the warpage along the dotted line of the package. As shown in FIG. 17B, the proposed model generated warpage values 5% larger than those from the original formula and had 23.8% differences from those by the finite element tool. More importantly, the proposed model kept the same warpage trend as the finite element tool, which is crucial for effective warpage optimization. Further, as mentioned above, the proposed model always over estimates the warpage calculated by Suhir's solution, guaranteeing that the invention's warpage model will never under estimate the warpage effect.

To show the effectiveness of our warpage model, we compared our algorithm with the TCG floorplanning algorithm that only considers area and wirelength, namely Lin-TCG. As shown in Table 2, the proposed algorithm can reduce the maximum warpage by about 52% with only 1% overheads in area and wirelength. Note that the final warpage values reported in Table 2 were from the commercial finite element tool Moldex3D although the simplified warpage formula is used to guide our floorplan optimization.

TABLE 2

| | Maximum warpage (mm) | | Area ($10^4 \times mm^2$) | | Total Wirelength (mm) | |
| --- | --- | --- | --- | --- | --- | --- |
| Case | Lin-TCG | Ours | Lin-TCG | Ours | Lin-TCG | Ours |
| Warpage1 | 0.319 | 0.061 | 2.09959 | 2.08152 | 27709.6 | 27865.7 |
| Warpage2 | 0.046 | 0.038 | 1.88348 | 1.9062 | 41165.1 | 37520 |
| Warpage3 | 0.273 | 0.221 | 2.54242 | 2.51909 | 61612.8 | 55034 |
| Warpage4 | 0.073 | 0.051 | 3.33425 | 3.42788 | 83964.5 | 103823 |
| Warpage5 | 0.100 | 0.091 | 3.7107 | 3.91596 | 152439 | 162983 |
| Comp. | 2.04 | 1 | 0.99 | 1 | 0.99 | 1 |

The invention's major contributions are summarized as follows:

(1) The invention proposes the first multi-dice package floorplanner that considers the warpage effect.

(2) The invention proposes an effective warpage model that can be embedded into a transitive closure graph (TCG) based floorplanner to help optimize the warpage effect.

(3) The invention proposes three new perturbations for TCG-based simulated annealing (SA) to optimize the warpage effect more directly.

(4) The invention proposes a force-directed detailed floorplanning optimization that utilizes the dead spaces to find the desired locations of the dies after SA.

(5) Experimental results show that the proposed algorithm can achieve 52% smaller maximum warpage with only 1% wirelength and area overhead, compared with a traditional floorplanning algorithm. The experimental results have shown the superiority of the invention's warpage model and floorplanning algorithm.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A non-transitory computer-readable medium containing instructions, which when read and executed by a computer, cause the computer to execute a method of warpage-aware floorplanning for heterogeneous integration structure, wherein the method comprises steps of:
   performing a layout partitioning to divide a layout into a plurality of grids;
   performing an initial floorplanning by assigning first geometric relations between a plurality of dies such that an effective material of each grid of said plurality of grids is determined;
   performing a global floorplanning to change said first geometric relations between said plurality of dies to second geometric relations to optimize warpage effect of said heterogeneous integration structure; and
   performing a detailed floorplanning to determine die order of placement of said plurality of dies based on material differences between said plurality of dies and an interposer.

2. The non-transitory computer-readable medium of claim 1, where said plurality of grids have an identical size.

3. The non-transitory computer-readable medium of claim 1, wherein a width and height of each grid of said plurality of grids is smaller than minimum width and height of said plurality of dies.

4. The non-transitory computer-readable medium of claim 1, wherein assigning said some geometric relations between said plurality of dies comprises assigning horizontal and vertical relations between said plurality of dies to satisfy the die-to-die minimum distance.

5. The non-transitory computer-readable medium of claim 1, wherein said global floorplanning includes three perturbations of peripheralization, matching and separation of dies.

6. The non-transitory computer-readable medium of claim 1, further comprising a fast simulated annealing based on TCG floorplan representation.

7. The non-transitory computer-readable medium of claim 1, wherein said detailed floorplanning includes available dead spaces searching to find grids that best match a material coefficient of a target die by a sliding window.

8. The non-transitory computer-readable medium of claim 7, wherein said detailed floorplanning further includes a force-directed detailed position optimization.

9. The non-transitory computer-readable medium of claim 8, wherein out-of-die warpage cost is modeled as a repulsive force, and a vector from a location of a starting pin to that of a terminal pin is modeled as an attractive force.

10. The non-transitory computer-readable medium of claim 9, wherein all repulsive forces and attractive forces are summed up to obtain the total force to find a desired moving direction of said target die.

11. A method of warpage-aware floorplanning for heterogeneous integration structure, which is executed by a computer, the method comprising:
   using the computer to perform the following:
   performing a layout partitioning to divide a layout into a plurality of grids;
   performing an initial floorplanning by assigning first geometric relations between a plurality of dies such that an effective material of each grid of said plurality of grids is determined;
   performing a global floorplanning to change said first geometric relations between said plurality of dies to second geometric relations to optimize warpage effect of said heterogeneous integration structure; and
   performing a detailed floorplanning to determine die order of placement of said plurality of dies based on material differences between said plurality of dies and an interposer.

12. The method of claim 11, where said plurality of grids have an identical size.

13. The method of claim 11, wherein a width and height of each grid of said plurality of grids is smaller than minimum width and height of said plurality of dies.

14. The method of claim 11, wherein assigning said some geometric relations between a plurality of dies comprises assigning horizontal and vertical relations between said plurality of dies to satisfy the die-to-die minimum distance.

15. The method of claim 11, wherein said global floorplanning includes three perturbations of peripheralization, matching and separation of dies.

16. The method of claim 15, further comprising a fast simulated annealing based on TCG floorplan representation.

17. The method of claim 11, wherein said detailed floorplanning includes available dead spaces searching to find grids that best match a material coefficient of a target die by a sliding window.

18. The method of claim 17, wherein said detailed floorplanning further includes a force-directed detailed position optimization.

19. The method of claim 18, wherein out-of-die warpage cost is modeled as a repulsive force, and a vector from a location of a starting pin to that of a terminal pin is modeled as an attractive force.

20. The method of claim 19, wherein all repulsive forces and attractive forces are summed up to obtain the total force to find a desired moving direction of said target die.

* * * * *